United States Patent [19]

Wallgren

[11] Patent Number: 4,666,076
[45] Date of Patent: May 19, 1987

[54] CURVED TIP FOR SOLDER EXTRACTOR

[75] Inventor: Linus E. Wallgren, Rockville, Md.

[73] Assignee: Pace, Incorporated, Laurel, Md.

[21] Appl. No.: 879,829

[22] Filed: Jun. 26, 1986

Related U.S. Application Data

[63] Continuation of Ser. No. 636,267, Jul. 31, 1984.

[51] Int. Cl.[4] ............................................. B23K 3/02
[52] U.S. Cl. ....................................... 228/20; 228/54
[58] Field of Search ............... 219/227, 228, 229, 238,
219/230, 264; 228/20, 46, 51, 52, 54, 57, 264;
403/206, 215, 361

[56] References Cited

U.S. PATENT DOCUMENTS

| | | | |
|---|---|---|---|
| 2,955,187 | 10/1960 | Campo | 228/20 |
| 3,163,145 | 12/1964 | Duhaime et al. | 228/20 |
| 3,239,124 | 3/1966 | Hathcock | 228/20 |
| 3,383,023 | 5/1968 | Brewster | 228/20 |
| 3,392,897 | 7/1968 | Siegel | 228/20 |
| 3,561,662 | 2/1971 | Duhaime et al. | 228/20 |
| 4,187,972 | 2/1980 | Vella | 228/20 |
| 4,225,076 | 9/1980 | Litt et al. | 228/20 |
| 4,269,343 | 5/1981 | Siegel et al. | 228/20 |

FOREIGN PATENT DOCUMENTS 1089172  1/1966  United Kingdom ............... 228/20

*Primary Examiner*—M. Jordan
*Attorney, Agent, or Firm*—Gerald J. Ferguson, Jr.;
Michael P. Hoffman; Ronni S. Malamud

[57] ABSTRACT

A replaceable tip for a hand-held pencil-like solder extractor having an axis and a coaxial passageway for removing solder from a planar workpiece. The tip is a tubular member of predetermined outside diameter having a central bore of substantially constant cross-section, the tubular member having a first linear section of predetermined length which is coaxially received within the passageway of the solder extractor, a second linear section of predetermined length having a free end for contacting solder, and an intermediate curved section which acts as a detent for limiting the length of the tubular member which is insertable into the solder extractor passageway and maintains the free end a fixed distance from the solder extractor. The first and second sections are angled with respect to one another so that, in use, when an operator grasps the solder extractor in a pencil-like manner, the second linear section is disposed substantially perpendicularly to the planar surface of a workpiece, e.g., a printed circuit board.

12 Claims, 2 Drawing Figures

CURVED TIP FOR SOLDER EXTRACTOR

This application is a continuation of Ser. No. 636,267, filed July 31, 1984, now abandoned.

BACKGROUND OF THE INVENTION

1. Field of the Invention:

The present invention relates to solder extractors. More particularly, the present invention relates to an improved replaceable tip for a solder extractor.

2. Description of the Prior Art:

Repair of electronic equipment often involves the need to remove solder fillets and joints efficiently without otherwise affecting the circuit as a whole or the components therein. Generally speaking, solder extraction is done by applying the front end of a heated tubular element to a soldered area to melt the solder, then suction applied to the rear end of the tubular member draws the molten solder off into the tube.

Siegel, U.S. Pat. No. 3,392,897 discloses a solder extractor comprising a coaxial instrument of pencil type construction in which a tubular heated tip, a heat generating element, a molten solder receiving chamber, and a gripping handle are all disposed concentrically and/or in axial succession one to another, with an axial passageway front to rear for the flow of extracted solder. This coaxial pencil-type construction is taught to have a number of advantages in solder removal:

(1) the molten solder moves in a straight line thereby avoiding the possibility of blockage or wear at bend regions and providing a good suction effect from the vacuum source;

(2) the solder extractor as a whole is light and well-balanced, a pencil-like grip permitting close, accurate control of the heated tip with less danger of burn damage to the circuit and components at areas near the solder being removed;

(3) the solder extractor can be readily applied to work pieces that have nearby encumbrances such as upstanding circuit components; and (4) radiation and convection heating effects on the work piece are minimized.

However, such prior art solder extractors utilize a straight tubular tip, which when utilized in a pencil-like grip, acts to cause molten solder to be drawn substantially parallel to the workpiece surface, e.g., the surface of a printed circuit board. This drawing of the solder along the surface of the workpiece may be disadvantageous, especially in the case of a circuit board have intricate and/or closely spaced circuits. Alternatively, the tubular tip may be held substantially perpendicular to the circuit board, to desirably draw the molten solder upward and away from the board, but this hand position produces operator fatigue and loss of stability.

Moreover, since the tubular tip of the prior art is held in place by a set screw disposed in the solder extractor for this purpose, replacement of the tip, when it becomes worn or fouled with solder, can result in mispositioning of the tip causing fluctuations in the length of the projection of the tip from the body of the solder extractor. Such fluctuations can alter heating rates and cause lowered temperatures, when the tip projects too far from the solder extractor, or can cause undesired radiation and convective heating effects on the workpiece, due to the solder extractor heating element, when this tip does not project sufficiently from the solder extractor.

SUMMARY OF THE INVENTION

It is an object of the present invention to provide a replaceable tip for a hand-held pencil-like solder extractor which will remove solder from the workpiece in a direction substantially perpendicular to the workpiece, while allowing the operator to grasp the solder extractor in a pencil-like manner, the grasping hand being supported by the workpiece or work table, as in writing with a pencil, for stability and comfort.

It is a further object of the present invention to provide a replaceable tip for a solder extractor which can be reliably positioned to maintain a predetermined projection from the solder extractor body.

The present invention provides a replaceable tip for a hand-held pencil-like solder extractor having an axis and a coaxial passageway for removing solder from a planar surface. The tip comprises a tubular member of predetermined outside diameter having a central bore of substantially constant cross-section. The tubular member comprises a first linear section of predetermined length having an axis, which is coaxially receivable in the passageway of the solder extractor, a second linear section of predetermined length having an axis and a free end, which is used for contacting solder, and a detent section intermediate the first and second sections for limiting the length of the tubular member which is received within the solder extractor passageway and maintaining the free end of the second section a fixed distance from the solder extractor. The axis of the second section forms an angle with the axis of the first section such that when the solder extractor is grasped by an operator in a pencil-like manner the axis of the second section is substantially perpendicular to the planar surface from which solder is to be removed, and thus molten solder will be drawn into the hollow tube away from the workpiece surface.

DETAILED DESCRIPTION OF THE INVENTION

Hand-held, pencil-like solder extractors are known in the art. Typically, such solder extractors comprise a replaceable tubular heated tip, a heat generating element for supplying heat to the tip, a molten solder receiving chamber and a gripping handle disposed in concentric and/or axial succession one to the other, with an axial passageway front to rear for the flow of extracted solder. In use, the operator applies the hot tip to a soldered connection long enough to melt the solder, then initiates a blast of suction which draws the now molten solder up through the tip, along the axial passageway, and into the solder receiving chamber. In this regard, Siegel, U.S. Pat. No. 3,392,897, discloses such conventional solder extractors and the use thereof, the disclosure of which is hereby incorporated by reference.

Figure 1:
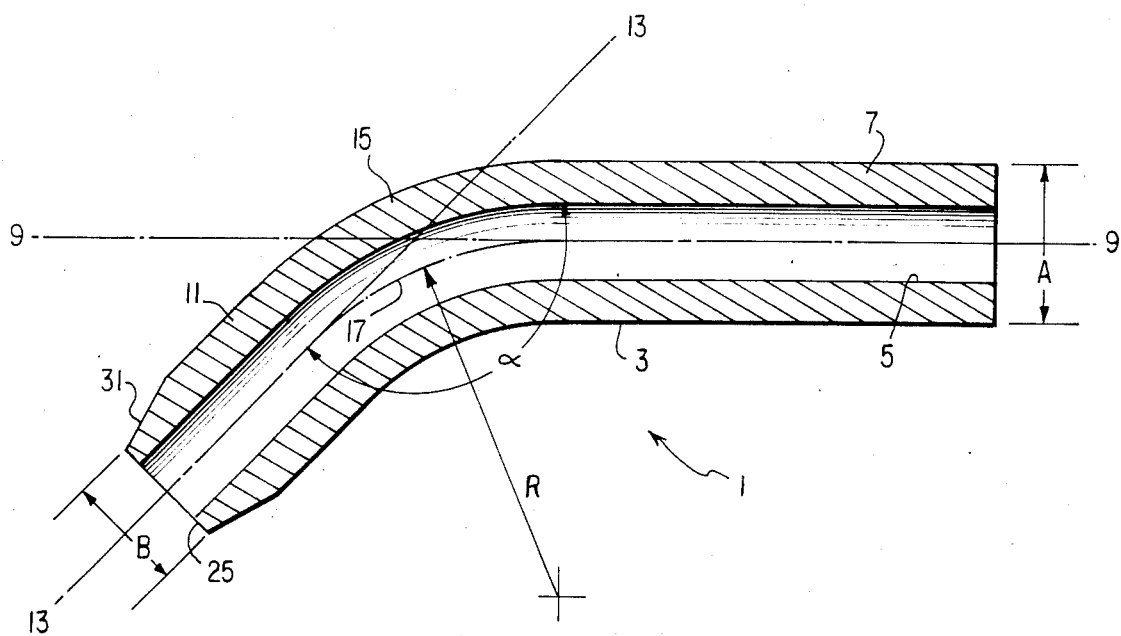
FIG. 1 is a sectional view of a replaceable tip for a solder extractor in accordance with the present invention.

The present invention is directed to a replaceable tip for such hand-held, pencil-like solder extractors. FIG. 1 illustrates a sectional view of a tip in accordance with the present invention. In particular, the tip, generally indicated at 1, comprises a tubular member 3 of predetermined outside diameter, indicated as "A", having central bore 5 of substantially constant cross-section. The tubular member 3 and the central bore 5 are both of substantially circular cross-section. Of course, other cross-sectional shapes can be utilized, such as polygonal cross-sections. However, these shapes are more difficult to manufacture, especially in internal cross-section, and the apices where two sides meet offer locations for solder build-up. Accordingly, a circular cross-section is preferred. The tubular member 3 comprises a first linear section 7 of predetermine length having an axis, indicated by dot-dash line 9—9, a second linear section 11 of predetermined length having an axis, indicated by dot-dash line 13—13, and a transition section 15 intermediate the first linear section 7 and the second linear section 11.

The axis 9—9 of the first linear section 7 forms an angle $\alpha$ with the axis 13—13 of the second linear section 11. The function of this angle will be explained in more detail hereinafter.

In order to ensure the free flow of molten solder through the central bore 5, the transition section 1 is formed as a smooth curve joining the first linear section 7 with the second linear section 11. In this regard, the center line of tubular member 3, comprises the axis 9—9 in the first linear section 7, the axis 13—13 in the second linear section 11 and the dotted line 17 (joining axes 9—9 and 13—13) in the transition section 15. The radius of curvature R in the transition section 15 must produce a smooth curve so as to allow free flow of molten solder therethrough. A smooth curve can be created by a constantly increasing or decreasing radius of curvature or a constant radius of curvature where the first and second linear sections are tangential to the curve at its beginning and end, respectively. For ease of manufacture, a constant radius curve (R=constant) is preferred.

Figure 2:
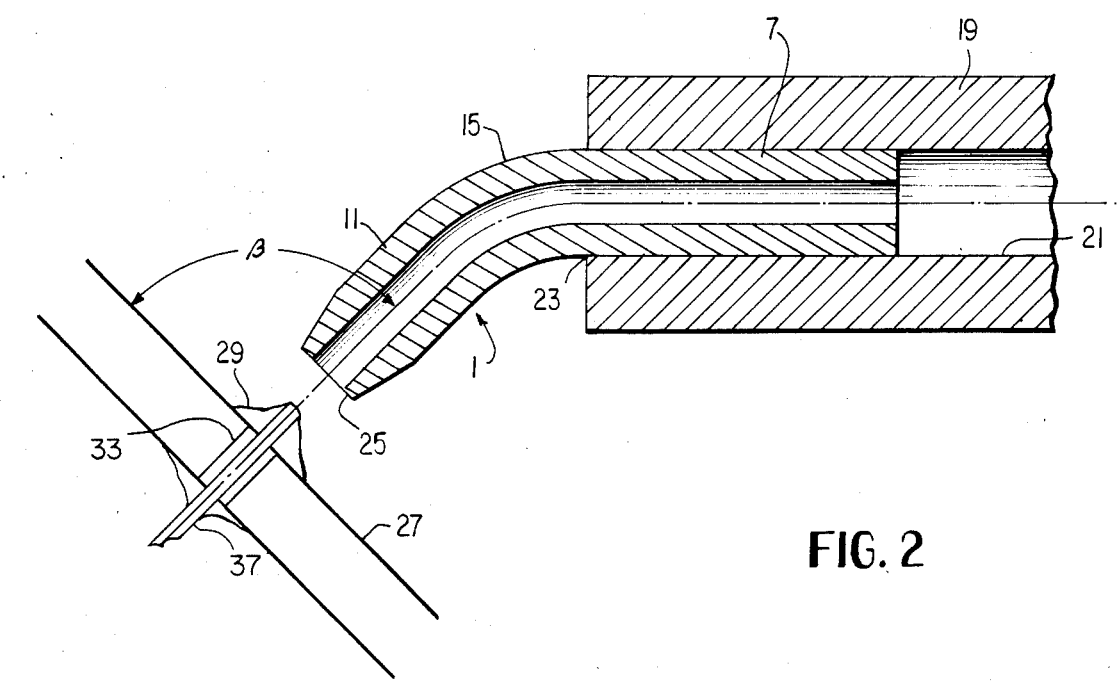
FIG. 2 is a sectional view of a replaceable tip in accordance with the present invention in place in a conventional solder extractor.

The cuved transition section 15 also serves as a detent means for limiting the length of the tubular member 3 which is inserted into the solder extractor. As shown in FIG. 2, the tip 1 of the present invention is connected to the heating element 19 of a solder extractor by coaxially inserting the first linear section 7 into an axial passageway 21 of the solder extractor which communicates with a solder receiving chamber and vacuum source (not shown). As the first section 7 is inserted into the heating element 19, the curvature of the transition section 15 will act as an abutment 23 to prevent further insertion. Thus, in replacing tips, an operator need only insert the first linear section 7 into the heater element 19 until it will go no further. The operator can then secure the tip in place as by tightening a set screw (not shown), and be confident that a predetermined length of the tip (in this case the length of the first linear section 7) is in heat conducting contact with the heater element 19. Moreover, the free end 25 of the tip 1 will be maintained a fixed distance from the heating element by virtue of the angle $\alpha$ between the first and second linear sections (7 and 11, respectively), the radius of curvature R of the transition section 15 and the predetermined length of the second linear section 11.

The angle $\alpha$ between the axes 9—9 and 13—13 of the first linear section 7 and the second linear section 11 is selected so that when the tip 1 is inserted into the heating element 19 of the solder extractor, and the solder extractor is manually grasped by the operator in a pencil-like manner, the axis 13—13 of the second linear section 11 will be disposed substantially perpendicular (angle $\beta$ in FIG. 2 will be about 90°) to the planar surface 27 of a workpiece (e.g., a printed circuit board) having solder 29 thereon which holds component lead wire 37 in place in printed circuit board thruhole 33. The thru-hole 33 may be plated on one or both sides of the circuit board, with the plating extending through the board, so as to form an interfacial connection. While different operators will have different manners of holding the solder extractor in a pencil-like manner, an angle $\alpha$ of 120°–150° generally will allow comfort and stability while maintaining the angle $\alpha$ at about 90°. Preferably, the angle $\alpha$ is of 130°–135°.

In a preferred embodiment of the present invention, the outside diameter "A" of the tubular member 3 tapers to a smaller diameter "B" over a portion 31 of the length of the second linear section 11 adjacent to the free end 25 of the second linear section. Desirably, this lessened diameter "B" is narrower than the width of the solder 29 (as shown in FIG. 2) to be removed to ensure that all of the solder which is melted will be drawn through the central bore 5 upon application of a vacuum to the central bore.

The replaceable tip of the present invention is generally fashioned of copper or an alloy of high heat conductance. Desirably, the tip is coated with a corrosion-resistant coating, such as a nickel coating by nickel-plating or other techniques well-known in the art, to resist corrosion by the solder.

In a particularly preferred embodiment of the present invention, the tip is formed of a copper tube, one end of which is swaged down to form a taper to the free end of the tip, the tube is then bent to the appropriate angle and then nickel-plated. More particularly, a copper tube of about one-eighth inch outside diameter having a central bore of about 0.050 more or less inch internal diameter is utilized. The first linear section is about 1 5/16 inches in length, the second linear section is about 7/16 inch in length and the transition section is a constant radius curve of a radius of about ¼ inch. The taper is formed by swaging down over a length of about 0.32 inch adjacent the free end of the second section. The angle is about 130°–135°.

What is claimed is:
1. A solder extractor comprising
   a replaceable, curved, tubular tip having at least a first linear section and a curved portion having a first end adjacent the linear section;
   a tubular heating member having a forward end and a rearward end, said linear section of the curved tip being disposed within said tubular member such that said curved portion engages said forward end of the heating member;
   a handle connected to said rearward end of the heating member; and
   means for receiving molten solder which has passed through at least said tip.

2. A solder extractor as in claim 1 where said curved tip includes a second linear portion adjacent the end of said curved portion opposite said first end thereof, said first and second linear portions each having axes.

3. A solder extractor as in claim 1 where said handle is in line with said tubular heating member such that the extractor is of the pencil type.

4. A solder extractor as in claim 3 wherein the angle formed between said axis of said first section and said axis of said second section is of 120°–150°.

5. A solder extractor as in claim 4 wherein said angle is of 130°–135°.

6. A replaceable tip for a hand-held pencil-like solder extractor having an axis and a tubular heating member having a forward end and a rearward end with a handle connected to the rearward end and means for receiving molten solder which has passed at least through said tip after being removed from a planar surface, said tip comprising a tubular member having a bore, said tubular member comprising a first linear section of predetermined length having an axis, said first linear section being receivable within said tubular heating member so that said first linear section is directly heated by said solder extractor, a second section having an axis and a free end for contacting said solder, and a curved section intermediate said first and second sections where said curved section is adapted to engage the forward end of said heating member to limit the distance said tubular member extends into said heating member and to maintain said free end of said second section at a fixed distance from said solder extractor, said axis of said second section forming an angle with said axis of said first section whereby when said solder extractor is grasped by an operator in a pencil-like manner the axis of said second section is substantially perpendicular to the plant surface from which solder is to be removed.

7. The replaceable tip as claimed in claim 6, wherein said detent means comprises a curved section of said tubular member.

8. The replaceable tip as claimed in claim 7, wherein the curvature of said curved section makes a smooth transition from said second section to said first section whereby extracted solder may freely flow from said second section to said first section.

9. The replaceable tip as claimed in claim 4, wherein said curved section is a constant radius curve.

10. The replaceable tip as claimed in claim 6, wherein the outside diameter of said tubular member tapers to a smaller diameter at said free end over a portion of the length of said second section adjacent to said free end.

11. The replaceable tip as claimed in claim 6, wherein the angle formed between said axis of said first section and said axis of said second section is of 120°–150°.

12. The replaceable tip as claimed in claim 11, wherein said angle is of 130°–135°.

* * * * *